(12) United States Patent
Park et al.

(10) Patent No.: US 10,468,962 B2
(45) Date of Patent: Nov. 5, 2019

(54) POWER SUPPLY FOR COMPENSATING FOR CURRENT DEVIATION AND OPERATING METHOD THEREOF

(71) Applicant: Samsung Electronics Co., Ltd., Suwon-si, Gyeonggi-do (KR)

(72) Inventors: Jeonggyu Park, Yongin-si (KR); Jaejin Lee, Suwon-si (KR); Kwansung Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/114,728

(22) Filed: Aug. 28, 2018

(65) Prior Publication Data

US 2019/0068048 A1 Feb. 28, 2019

(30) Foreign Application Priority Data

Aug. 29, 2017 (KR) ........................ 10-2017-0109331

(51) Int. Cl.
*H02M 3/156* (2006.01)
*H02M 1/08* (2006.01)
(Continued)

(52) U.S. Cl.
CPC ............. *H02M 1/08* (2013.01); *H02M 3/156* (2013.01); *H02M 3/1584* (2013.01);
(Continued)

(58) Field of Classification Search
None
See application file for complete search history.

(56) References Cited

U.S. PATENT DOCUMENTS 6,670,794 B1 * 12/2003 Wang .................. H02M 3/1584
  323/213
8,648,639 B2 * 2/2014 Lee ........................ H02M 3/156
  327/172
(Continued)

FOREIGN PATENT DOCUMENTS

KR 10-0785941 B1 12/2007

*Primary Examiner* — Jeffrey A Gblende
(74) *Attorney, Agent, or Firm* — Jefferson IP Law, LLP

(57) ABSTRACT

The present disclosure relates to a communication scheme and system for converging a $5^{th}$ generation (5G) communication system for supporting a data rate higher than that of a $4^{th}$ generation (4G) system with an internet of things (IoT) technology. The present disclosure is applicable to intelligent services (e.g., smart homes, smart buildings, smart cities, smart cars, connected cars, health care, digital education, retails, and security and safety-related services) based on the 5G communication technology and the IoT-related technology. An operation method of a power supply is provided. The operation method includes calculating an inter-phase current deviation by averaging current deviations between a first phase current and a second phase current, comparing the inter-phase current deviation with a first threshold value, adjusting a pulse width modulation (PWM) duty value of at least one of a first phase and a second phase according to a result of the comparing, and compensating for inter-phase current deviation according to the adjusted PWM duty value.

17 Claims, 8 Drawing Sheets

(51) Int. Cl.
    *H02M 7/217*       (2006.01)
    *H02M 3/158*       (2006.01)
    *H02M 1/00*        (2006.01)

(52) U.S. Cl.
    CPC .... *H02M 7/217* (2013.01); *H02M 2001/0009* (2013.01); *H02M 2001/0025* (2013.01)

(56) References Cited

U.S. PATENT DOCUMENTS

| | | | |
|---|---|---|---|
| 9,543,838 B2 * | 1/2017 | Babazadeh | G01R 31/40 |
| 2004/0123167 A1 | 6/2004 | Chapuis | |
| 2009/0167080 A1 * | 7/2009 | Carpenter | H02M 3/1584 |
| | | | 307/14 |
| 2010/0283422 A1 * | 11/2010 | Tan | G11B 19/28 |
| | | | 318/720 |
| 2015/0333629 A1 * | 11/2015 | Jang | H02M 3/1584 |
| | | | 323/271 |
| 2016/0190940 A1 * | 6/2016 | Yan | H02M 3/285 |
| | | | 363/17 |
| 2016/0233766 A1 * | 8/2016 | Todorov | H02M 3/1584 |
| 2018/0351458 A1 * | 12/2018 | Chen | H02M 3/1584 |

\* cited by examiner

POWER SUPPLY FOR COMPENSATING FOR CURRENT DEVIATION AND OPERATING METHOD THEREOF

CROSS-REFERENCE TO RELATED APPLICATION(S)

This application is based on and claims priority under 35 U.S.C. § 119(a) of a Korean patent application number 10-2017-0109331, filed on Aug. 29, 2017, in the Korean Intellectual Property Office, the disclosure of which is incorporated by reference herein in its entirety.

BACKGROUND

1. Field

The disclosure relates to a technology for distributing electric current by designing a 2-phase input terminal to meet the growing demand for high-powered power supply.

2. Description of Related Art

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system. Implementation of the 5G communication system in millimeter wave (mm Wave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM) (FQAM) and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the internet of things (IoT) in which distributed things or components exchange and process information. The combination of the cloud server-based big data processing technology and the IoT begets internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

Meanwhile, in order to meet the requirements for highly integrated, highly dense, and highly powerful base stations, servers, and network systems, adoption of a power supply block with two channels (or phases) may be considered in the design of a 300 Watt or higher alternating current-direct current (AC-DC) or direct current-alternating current (DC-AC) converter, thereby making it possible to reduce DC power loss proportional to $I^2*R$ and introduce a topology requiring a small number of components.

In order to protect against an imbalance between the electric currents on the two channels, it may be possible to use a method of increasing or decreasing a fine duty corresponding to a small amount of electric current value every pulse width modulation (PWM) cycle, the small amount of electric current value being determined by a power control integrated circuit (IC) when an electric power deviation occurs. In this case, however, it takes a long time to achieve a balance between the electric currents on the two channels, and the necessity of demanding operations (comparison and addition) for achieving balance during a startup or load transient imposes significant load and steady-state saturation time on the control loop even in a digital controller operating with the more complex algorithms as well as in a simple analog controller, resulting in malfunction and stress to/overheating of the power supply circuit.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a power supply and operating method thereof that is capable of compensating for inter-phase current deviation in a 2-phase current of a power circuit in a power supply.

In accordance with an aspect of the disclosure, an operation method of a power supply is provided. The operation method includes calculating an inter-phase current deviation by averaging current deviations between a first phase current and a second phase current, comparing the inter-phase current deviation with a first threshold value, adjusting a pulse width modulation (PWM) duty value of at least one of a first phase and a second phase according to a result of the comparing, and compensating for inter-phase current deviation according to the adjusted PWM duty value. In an implementation, the power supply includes a direct current-direct current (DC-DC) convertor or an alternating current-direct current (AC-DC) converter.

In an implementation, the operation method of the power supply further includes, if the inter-phase current deviation is greater than the first threshold value, calculating a duty adjustment value using the inter-phase current deviation and a first gain and increasing the PWM duty value of the second phase using the duty adjustment value.

In an implementation, the operation method of the power supply further includes, if the inter-phase current deviation is less than a second threshold value, calculating a duty adjustment value using the inter-phase current deviation and a second gain and increasing the PWM duty value of the first phase using the duty adjustment value. Here, a sum of the first and second threshold values is 0.

In an implementation, the operation method of the power supply further includes, when the inter-phase current deviation is equal to or less than the first threshold value and equal to or greater than a second threshold value, checking whether the inter-phase current deviation is greater than 0 and adjusting the PWM duty value of the first or second phase using a predetermined minimum duty value according to a result of the checking.

In an implementation, the operation method of the power supply further includes, if the inter-phase current deviation is greater than 0, increasing the PWM duty value of the second phase using the minimum duty value and, if the inter-phase current deviation is equal to or less than 0, increasing the PWM duty value of the first phase using the minimum duty value.

In an implementation, the first phase current and the second phase current are individually obtained by converting a first-order side current value of the power supply to an average value via a sampling integration method. In an implementation, the first-order side is located at an input terminal that is not linked to any inductor or switch of the power supply.

In an implementation, the operation method of the power supply further includes sensing the first phase current and the second phase current only during a PWM on-time.

In an implementation, the operation method of the power supply further includes increasing a current sensing level using a parallel bias voltage when sensing the currents.

In accordance with another aspect of the disclosure, a power supply is provided. The power supply includes a power supply unit and a current deviation controller configured to control to calculate an inter-phase current deviation by averaging current deviations between a first phase current and a second phase current of the power supply unit, compare the inter-phase current deviation with a first threshold value, adjust a pulse width modulation (PWM) duty value of at least one of a first phase and a second phase according to a result of the comparing, and compensate for inter-phase current deviation according to the adjusted PWM duty value.

In an implementation, the power supply unit is implemented with a direct current-direct current (DC-DC) convertor or an alternating current-direct current (AC-DC) converter.

In an implementation, the current deviation controller is further configured to control to, if the inter-phase current deviation is greater than the first threshold value, calculate a duty adjustment value using the inter-phase current deviation and a first gain and increase the PWM duty value of the second phase using the duty adjustment value.

In an implementation, the current deviation controller is further configured to control to, if the inter-phase current deviation is less than a second threshold value, calculate a duty adjustment value using the inter-phase current devia-tion and a second gain and increase the PWM duty value of the first phase using the duty adjustment value. In an implementation, a sum of the first and second threshold values is 0.

In an implementation, the current deviation controller is further configured to control to, when the inter-phase current deviation is equal to or less than the first threshold value and equal to or greater than a second threshold value, check whether the inter-phase current deviation is greater than 0 and adjust the PWM duty value of the first or second phase using a predetermined minimum duty value according to a result of the checking.

In an implementation, the power supply further includes at least one field effect transistor (FET) implemented to sense the first phase current and the second phase current only during a PWM on-time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
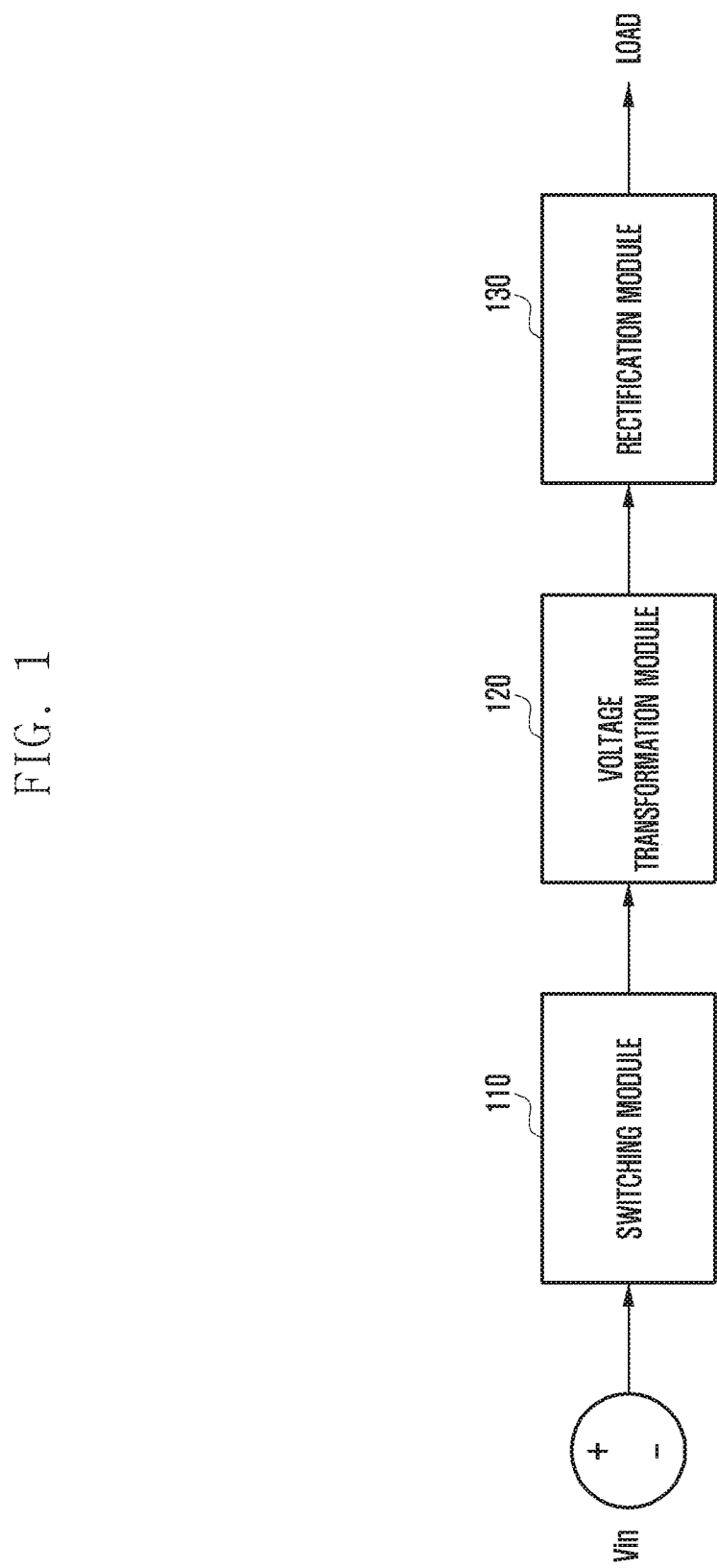
FIG. 1 is a block diagram illustrating a configuration of a power supply according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements are exaggerated, omitted, or simplified in the drawings. In practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed description of embodiments and the accompanying drawings. The disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time or may be performed in reverse order according to their functions.

According to various embodiments of the disclosure, the term "module", means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

Although depicted in a particular order in a drawing, two successive operations may be performed in reverse order or in parallel. It is obvious that an operation may be performed optionally unless expressly stated as essential.

FIG. 1 is a block diagram illustrating a configuration of a power supply according to an embodiment of the disclosure.

Referring to FIG. 1, the power supply may include a switching module 110 for receiving a voltage input from an external power supply unit and performing a switching operation with a plurality of switches in a mutual compensation manner to output a voltage, a voltage transformation module 120 for transforming the output voltage of the switching module 110 and outputting the transformed voltage, and a rectification module 130 for rectifying the output voltage of the voltage transformation module 120. According to an embodiment of the disclosure, the power supply may include a direct current-direct current (DC-DC) converter and an alternating current-direct current (AC-DC) converter.

With the recent trend to high-power designs of energy-saving DC-DC converters, design of a 2-phase input terminal is being considered to distribute an electric current for improvement of efficiency. However, this method has a drawback in that a current deviation caused by inaccurate phase-specific input current distribution brings about power circuit imbalance/stress problems; the disclosure proposes a method for solving the above problems.

Figure 2:
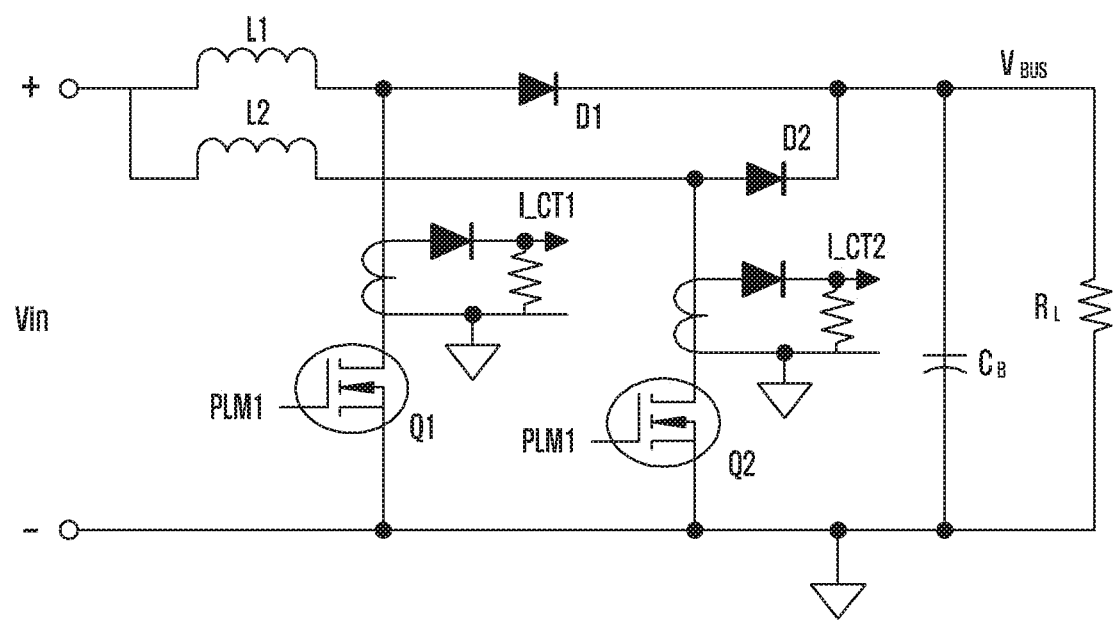
FIG. 2 is a circuit diagram for explaining a process of sensing electric currents in a power supply with a 2-phase current according to an embodiment of the disclosure.

FIG. 2 is a circuit diagram for explaining a process of sensing electric current in a power supply with a 2-phase electric current according to an embodiment of the disclosure.

Referring to FIG. 2, the power supply of the disclosure may be a converter having an interleaved boost (alternating at 180° positions) topology for 2-phase currents flows. In the interleaved boost topology, the electric currents may be sensed through the output, i.e., the first current (I_CT1) and the second current (I_CT2).

For example, the I_CT1 may be sensed between a first inductor L1 and a first field effect transistor (FET) Q1, and the I_CT2 may be sensed between a second inductor L2 and a second FET Q2.

The I_CT1 and the I_CT2 may be transferred to a controller for equal current control.

Figure 3:
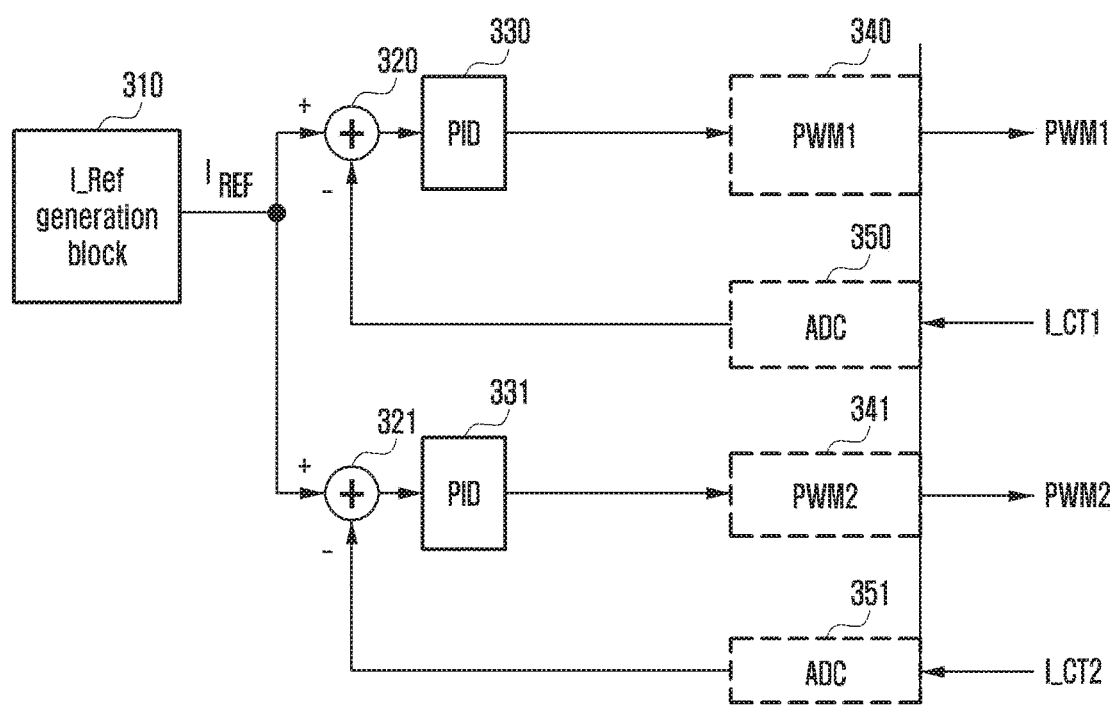
FIG. 3 is a circuit diagram for explaining a process of compensating for inter-phase current deviation in a 2-phase current according to an embodiment of the disclosure.

FIG. 3 is a circuit diagram for explaining a process of compensating for inter-phase current deviation in a 2-phase electric current according to an embodiment of the disclosure.

Referring to FIGS. 2 and 3, the power supply may include a controller for compensating for inter-phase current deviation in a 2-phase current. The controller may include a reference current generation block 310, first and second adders 320 and 321, first and second proportional integral derivative (PID) compensators 330 and 331, first and second pulse width modulation (PWM) processors 340 and 341, and first and second analog-to-digital converters (ADCs) 350 and 351.

The reference current generation block 310 may generate a reference signal ($I_{REF}$) for compensating for the inter-phase current deviation in a 2-phase current based on the I_CT1 and the I_CT2 and transfer the reference signal ($I_{REF}$) to first and second adders 320 and 321.

The first ADC 350 may convert the I_CT1 to the first digital signal and transfer the first digital signal to the first adder 320. The first adder 320 may perform an addition operation on the first digital signal and the reference signal ($I_{REF}$) and transfer the operation result value to the first PID compensator 330.

The first PID compensator 330 may calculate a compensation value by applying at least one of proportional control, integral control, and derivative control to the operation result value. Afterward, the first PWM processor 340 may adjust the PWM duty for the I_CT1 based on the compensation value.

The second ADC 351 may convert the I_CT2 to the second digital signal and transfer the second digital signal to the second adder 321. The second adder 321 may perform an addition operation on the second digital signal and the reference signal ($I_{REF}$) and transfer the operation result value to the second PID compensator 331.

The second PID compensator 331 may calculate a compensation value by applying at least one of proportional control, integral control, and derivative control to the operation result value. Afterward, the second PWM processor 341 may adjust the PWM duty for the I_CT2 based on the compensation value.

However, the method of FIG. 3 has the drawbacks of a vague standard for generating the reference signal ($I_{REF}$) and jitter probability caused by use of a raw current difference value as the input to the first and second PID compensators 330 and 331 with a large gain.

Figure 4:
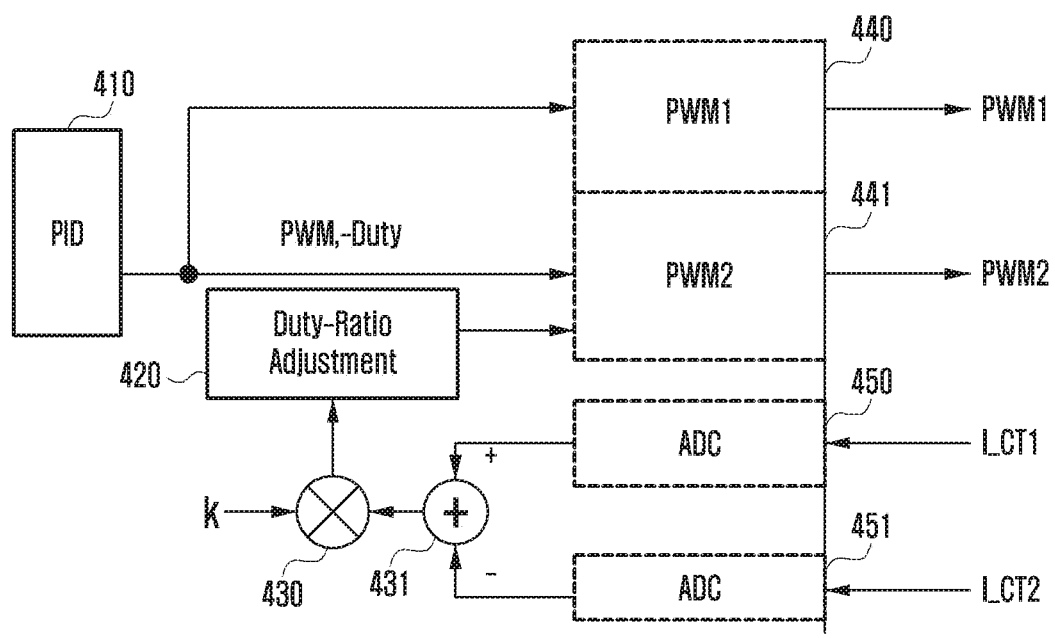
FIG. 4 is a circuit diagram for explaining a process of compensating for a current deviation of a 2-phase current according to another embodiment of the disclosure.

FIG. 4 is a circuit diagram for explaining a process of compensating for a current deviation of a 2-phase current according to another embodiment of the disclosure.

Referring to FIGS. 2 and 4, the power supply may include a controller for compensating for inter-phase current deviation in a 2-phase current. The controller may include a PID compensator 410, a duty-ratio adjuster 420, a multiplier 430, an adder 431, PWM processors 440 and 441, and first and second ADCs 450 and 451.

Unlike FIG. 3, in the embodiment of FIG. 4, the controller calculates the inter-phase current difference, multiplies the difference value by a predetermined gain (K), and reflects the multiplication result as a plus (+) or minus (−) value to the phase-2 PWM duty such that the difference between the two phase-specific currents becomes gradually smaller.

The first ADC 450 may convert I_CT1 to a first digital signal and transfer the first digital signal to the adder 431, and the second ADC 451 may convert I_CT2 to a second digital signal and transfer the second digital signal to the adder 431.

The adder 431 may perform an addition operation on the first and second digital signals to obtain a difference of digitalized phase-specific currents and transfer the difference value to the multiplier 430. The multiplier 430 may perform a multiplication operation on the difference value and a predetermined gain (K) and transfer the operation result value to the duty-ratio adjuster 420. The gain (K) may be set to a different value depending on the design specification of the power supply and network environment.

The duty-ratio adjuster 420 may adjust a phase-2 PWM duty based on the operation result from the multiplier 430.

Referring to FIG. 4, because the phase-2 duty is always controlled after the phase-1 duty in dependence thereon and thus always reacts with the inclusion of an offset to some extent, there is always a difference between two phase-specific currents and no reflection of previous stage inter-phase current difference to the phase-1 duty, which results in control instability during a transient current period, a long delay of saturation to a steady state, and occurrence of a large instantaneous current difference. Furthermore, a control offset may occur between phase-1 and phase-2 currents.

Figure 5:
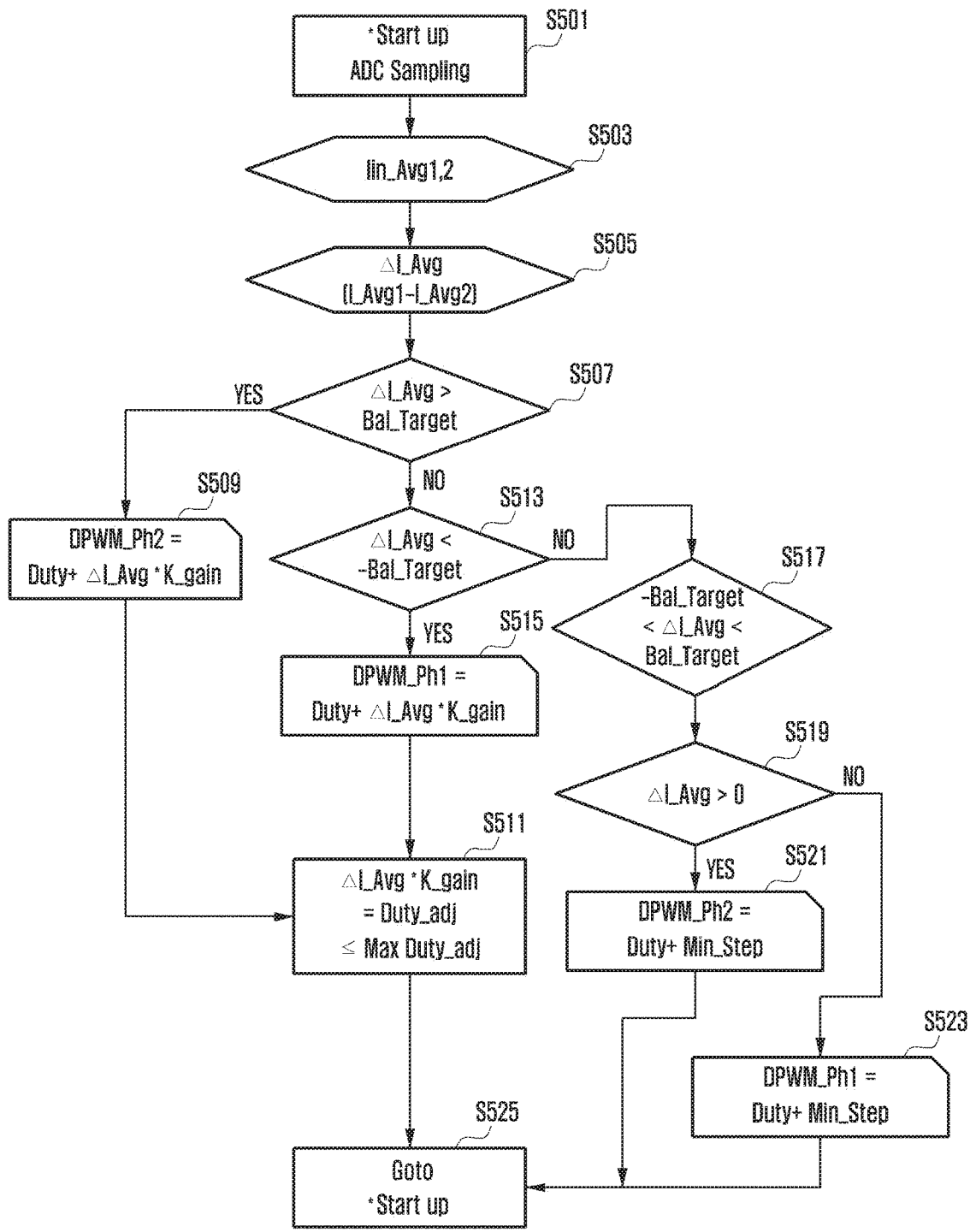
FIG. 5 is a flowchart illustrating an inter-phase current deviation compensation procedure according to an embodiment of the disclosure.

FIG. 5 is a flowchart illustrating an inter-phase current deviation compensation procedure according to an embodiment of the disclosure.

Referring to FIG. 5, a power supply may include a DC-DC converter and an AC-DC converter and compensate for an inter-phase current deviation.

The power supply may calculate an inter-phase current deviation by averaging a first phase current and a second phase current via a sampling integration method, compare the inter-phase current deviation with a first threshold value, adjust a PWM duty value of at least one of the first and second phases according to the comparison result, and compensate for the inter-phase current deviation according to the adjusted PWM duty value.

Through operations S501, S503, and S505, the power supply may read a first-order side current value with the ADC in response to the interrupt occurring every 100 uS by means of an electric current sensing device, convert the ADC-sampled first-order side current to an average value (Iin_Avg 1.2) via the sampling integration method (method of cumulative average of a number of digital samples), and calculate the average value of the current deviation of the phases via the sampling integration method (ΔI_Avg=I_Avg1−I_Avg2).

The first-phase current and the second-phase current may be obtained by converting the first order side current value to an average value via the sampling integration method. Here, the first-order side may be located at an input terminal that is not linked to any inductor or switch of the power supply and, by situating a current sensing unit (CT) at the corresponding input terminal, it is possible to minimize noise in sensing the input current.

According to an embodiment of the disclosure, the power supply may sense the first-phase and second-phase currents only during a PWM on-time. The power supply may be implemented with at least one FET for sensing the current optimally only during the PWM on-time and configured such that the energy generated by the inductor of the CT can be reset only through a second-order parallel resistor of the CT during a PWM off-time.

According to an embodiment of the disclosure, the power supply may increase a current sensing level by increasing the gain with a parallel bias voltage in order to protect against the reduction of the current sensing level in sensing the current.

If the inter-phase current deviation (ΔI_Avg) is greater than a first threshold value (Bal_Target) at operation S507, the power supply may calculate a duty adjustment value (ΔI_Avg*K_gain) using the inter-phase current deviation (ΔI_Avg) and a first gain (K_gain). At operation S509, the power supply may increase the PWM duty value (duty ratio) of the second phase using the duty adjustment value ($\Delta I\_Avg*K\_gain$) (DPWM_Ph2=Duty+$\Delta I\_Avg*K\_gain$).

That is, if the inter-phase current deviation ($\Delta I\_Avg$) is greater than a predetermined target gap (e.g., Bal_Target), the power supply may adjust the PWM duty value (duty ratio) of the second phase by multiplying the corresponding current deviation ($\Delta I\_Avg$) by an appropriate gain value (K_gain) in proportion to the corresponding current deviation ($\Delta I\_Avg$).

The first threshold value (Bal_Target) and the first gain (K_gain) may be preconfigured according to the design specification such as 2-phase current size, current deviation, and target current balancing level. The first threshold value (Bal_Target) and the first gain (K_gain) may be set to constants or variables, respectively.

At operation S511, the duty adjustment value ($\Delta I\_Avg*K\_gain$=Duty_adj) may be clamped to the maximum value in the range of not causing instability to the whole PWM control loop (Duty_adj≤Max_Duty_adj). For example, the duty adjustment value ($\Delta I\_Avg*K\_gain$=Duty_adj) may be set be in the range equal to or less than 5% of the maximum duty.

If the inter-phase current deviation ($\Delta I\_Avg$) is less than the first threshold value (Bal_Target) and less than the second threshold value (−Bal_Target) at operation S513, the power supply may calculate the duty adjustment value ($\Delta I\_Avg*K\_gain$) using the inter-phase current deviation ($\Delta I\_Avg$) and the second gain (K_gain), at operation S515. The power supply may increase the PWM duty value of the first phase using the duty adjustment value ($\Delta I\_Avg*K\_gain$) (DPWM_Ph1=Duty+$\Delta I\_Avg*K\_gain$).

If the inter-phase current deviation ($\Delta I\_Avg$) is less than a predetermined target gap (e.g., −Bal_Target), the power supply may adjust the PWM duty value (duty ratio) of the first phase by multiplying the corresponding current deviation ($\Delta I\_Avg$) by an appropriate gain value (K_gain) in proportion to the corresponding current deviation ($\Delta I\_Avg$).

Here, the sum of the first threshold value (Bal_Target) and the second threshold value (−Bal_Target) may be 0, and the first gain (K_gain) and the second gain (K_gain) may have the same value. However, the disclosure is not limited to the disclosed embodiments, and it may include the embodiments where the second threshold value (−Bal_Target) and the second gain (K_gain) are set differently depending on the design specifications.

The second threshold value (−Bal_Target) and the second gain (K_gain) may each be preconfigured depending on the design specifications such as 2-phase current size, current deviation, and target current balancing level. The second threshold value (−Bal_Target) and the second gain (K_gain) are set to constants or variables, respectively.

At operations S507 and S513, the power supply may adjust the PWM duty values (duty ratios) of the respective phases by the same method or different methods to control the inter-phase current deviation quickly and equally.

If the inter-phase current deviation ($\Delta I\_Avg$) is less than the first threshold value (Bal_Target) and greater than the second threshold value (−Bal_Target) at operation S517, the power supply determines at operation S519 whether the inter-phase current deviation ($\Delta I\_Avg$) is greater than 0 and adjusts the PWM duty value of the first or second phase with a predetermined minimum duty value (Min_Step) according to the determination result.

If it is determined at operation S519 that the inter-phase current deviation ($\Delta I\_Avg$) is greater than 0, the power supply may increase the PWM duty value of the second phase by the Min_Step (DPWM_Ph2=Duty+Min_Step).

If is determined at operation S519 that the inter-phase current deviation ($\Delta I\_Avg$) is equal to or less than 0, the power supply may increase the PWM duty value of the first phase by the Min_Step ((DPWM_Ph1=Duty+Min_Step).

After operations S511, S521, or S523, the power supply performs an operation of operation S525, and the procedure returns to operation S501.

Figure 6:
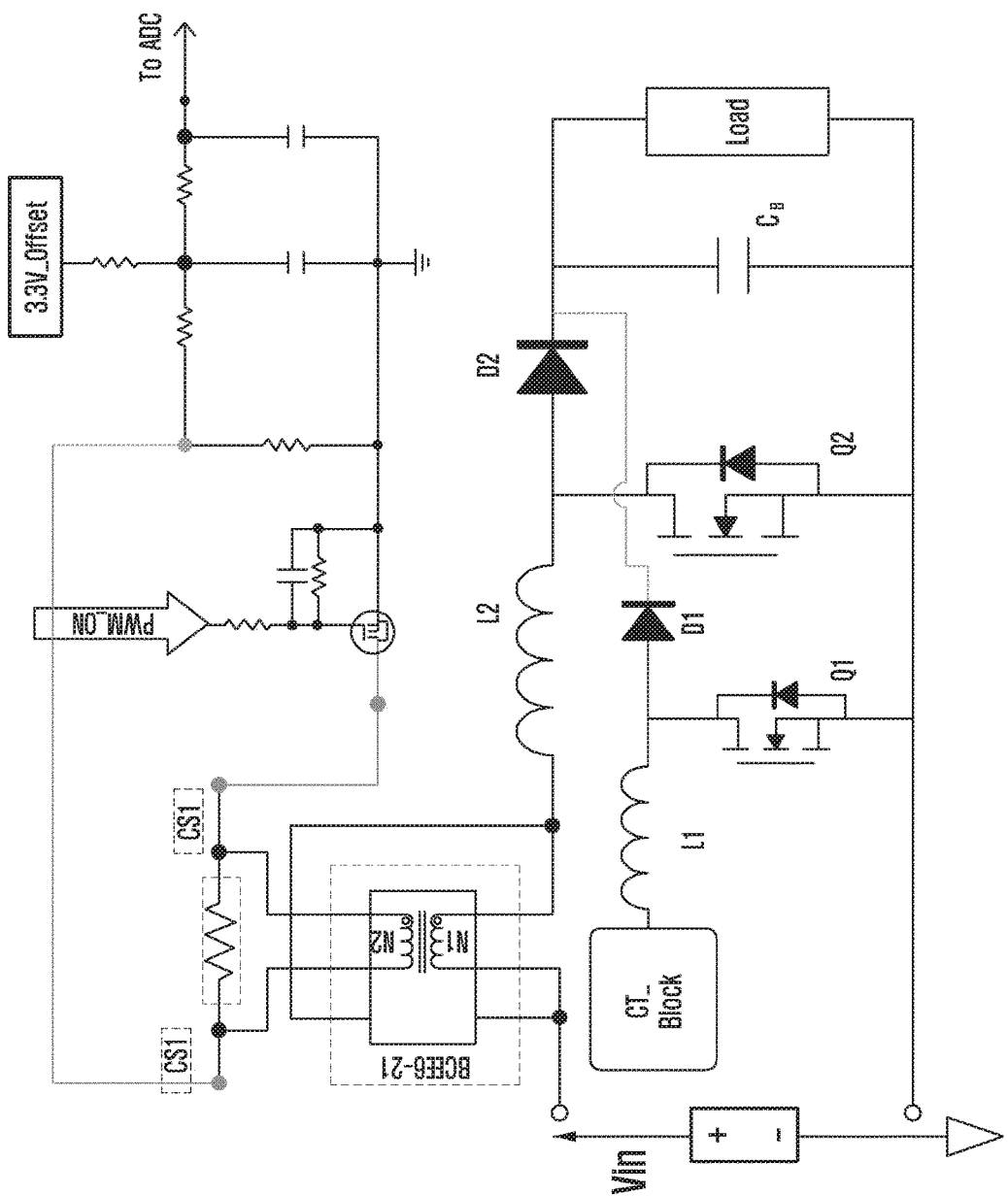
FIG. 6 is a circuit diagram for explaining a 2-phase current sensing process according to an embodiment of the disclosure.

FIG. 6 is a circuit diagram for explaining a 2-phase current sensing process according to an embodiment of the disclosure.

Referring to FIG. 6, the power supply may sense a 2-phase current by means of a power sensing block (CT_block) at a first-order side. Referring to FIG. 6, the first-order side may denote a first-order side in view of the main insulation transformer and an inductor input current. The acronym CT stands for a current transformer using a hall sensor effect.

In the disclosure, it is possible to minimize noise in sensing the input current by placing a CT_block at the first-order side.

According to an embodiment of the disclosure, the power supply may include at least one FET implemented to sense the 2-phase current only during the PWM on time. When the FET is turned off, the energy from an inductor (L) of the CT may be reset by only the second-order side parallel resister (resister between CS1+ and CS1− pins).

According to an embodiment of the disclosure, the power supply may increase a current sensing level by increasing the gain with a parallel bias voltage, if necessary, in order to protect against the reduction of the current sensing level in sensing the current.

Figure 7:
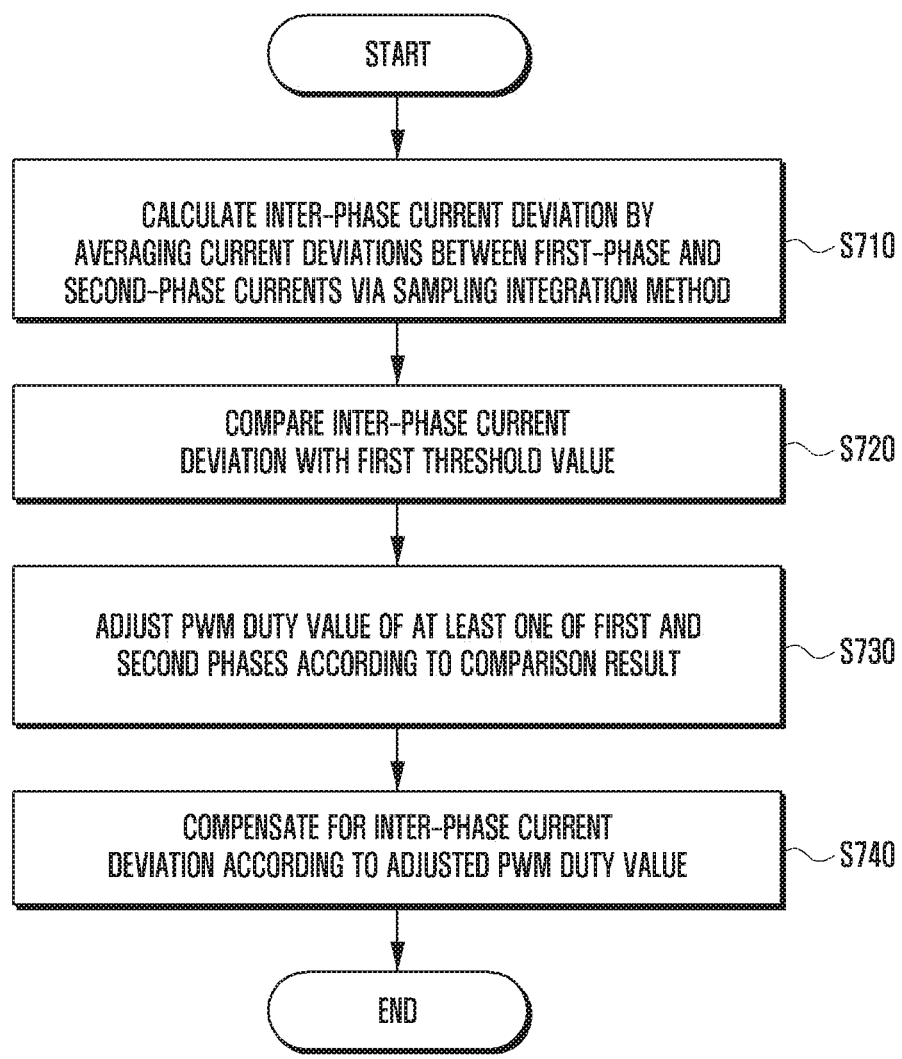
FIG. 7 is a flowchart for explaining an operation method of a power supply according to an embodiment of the disclosure.

FIG. 7 is a flowchart for explaining an operation method of a power supply according to an embodiment of the disclosure.

Referring to FIG. 7, the power supply may calculate, at operation S710, an inter-phase current deviation by averaging the current deviations between the first-phase current and second-phase current via a sampling integration method.

The power supply may compare, at operation S720, the inter-phase current deviation with a first threshold value and adjust, at operation S730, the PWM duty value of at least one of the first and second phases according to the comparison result.

At operation S740, the power supply may compensate for the inter-phase current deviation according to the adjusted PWM duty value.

Figure 8:
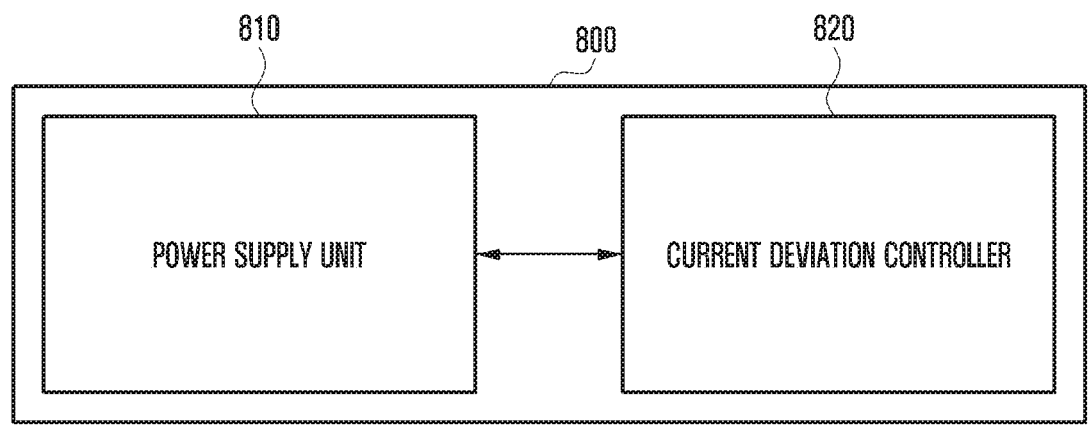
FIG. 8 is a schematic block diagram illustrating a power supply according to an embodiment of the disclosure.

FIG. 8 is a schematic block diagram illustrating a power supply according to an embodiment of the disclosure.

Referring to FIG. 8, a power supply 800 may include a power supply unit 810 and a current deviation controller 820.

The power supply unit 810 may be implemented with a DC-DC convertor or a DC-AC convertor being included in a base station, a server, etc.

The current deviation controller 820 may be implemented in firmware for the purpose of compensating for an inter-phase current deviation of a 2-phase current in the power supply unit 810. In the disclosure. The disclosure is characterized by selecting a digital control method for a power conversion control algorithm to implement the main algorithm of the disclosure and by a hardware configuration configured to receive a valid value only at a location where current sensing is performed and at an instant when current sensing is performed. According to an embodiment of the disclosure, the current deviation controller 820 may be implemented in hardware depending on the design specifications.

The current deviation controller 820 may calculate an inter-phase current deviation by averaging the inter-phase current deviations between the first-phase and second-phase currents of the power supply unit 810 via a sampling integration method, compare the inter-phase current deviation with a first threshold value, adjust the PWM duty value of at least one of the first and second phases, and compensate for the inter-phase current deviation according to the adjusted PWM duty value.

If the inter-phase current deviation is greater than the first threshold value, the current deviation controller 820 may calculate a duty adjustment value based on the inter-phase current deviation and a first gain and increase the PWM duty value of the second phase based on the duty adjustment value.

If the inter-phase current deviation is less than a second threshold value, the current deviation controller 820 may calculate the duty adjustment value based on the inter-phase current deviation and a second gain and increase the PWM duty value of the first phase based on the duty adjustment value. Here, the sum of the first and second threshold values may be 0.

If the inter-phase current deviation is less than the first threshold value and greater than the second threshold value, the current deviation controller 820 may determine whether the inter-phase current deviation is greater than 0 and adjust the PWM duty value of the first phase or the second phase based on a preset minimum duty value according to the determination result.

According to the determination result, the current deviation controller 820 may increase the PWM duty value of the second phase if the inter-phase current deviation is greater than 0 and the PWM duty value of the first phase if the inter-phase current deviation is less than 0, using the minimum duty value.

The first-phase and second-phase currents may be individually obtained by converting the first-order side current value of the power supply unit 810 to an average value via a sampling integration method. Here, the first-order side may be located at the input terminal that is not linked to any inductor or switch of the power supply unit 810.

According to an embodiment of the disclosure, the power supply 800 may include at least one FET implemented to sense the first-phase and second-phase currents only during a PWM on-time.

As described above, the power supply and operation method thereof according to an embodiment of the disclosure is advantageous in terms of protecting against malfunction and heating of the power circuit of the power supply by compensating the inter-phase current deviation in a 2-phase current.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An operation method of a power supply, the operation method comprising:
    calculating an inter-phase current deviation by averaging current deviations between a first phase current and a second phase current;
    comparing the inter-phase current deviation with a first threshold value;
    adjusting a pulse width modulation (PWM) duty value of at least one of a first phase and a second phase according to a result of the comparing; and
    compensating for the inter-phase current deviation according to the adjusted PWM duty value,
    wherein the adjusting of the PWM duty value comprises:
        if the inter-phase current deviation is greater than the first threshold value, calculating a duty adjustment value using the inter-phase current deviation and a first gain, and
        increasing the PWM duty value of the second phase using the duty adjustment value.

2. The operation method of claim 1, wherein the adjusting the PWM duty value further comprises:
    if the inter-phase current deviation is less than a second threshold value, calculating the duty adjustment value using the inter-phase current deviation and a second gain; and
    increasing the PWM duty value of the first phase using the duty adjustment value.

3. The operation method of claim 2, wherein a sum of the first and second threshold values is 0.

4. The operation method of claim 1, further comprising:
    when the inter-phase current deviation is equal to or less than the first threshold value and equal to or greater than a second threshold value, checking whether the inter-phase current deviation is greater than 0; and
    adjusting the PWM duty value of the first or second phase using a predetermined minimum duty value according to a result of the checking.

5. The operation method of claim 4, further comprising, if the inter-phase current deviation is greater than 0, increasing the PWM duty value of the second phase using the minimum duty value.

6. The operation method of claim 4, further comprising, if the inter-phase current deviation is equal to or less than 0, increasing the PWM duty value of the first phase using the minimum duty value.

7. The operation method of claim 1, wherein the first phase current and the second phase current are individually obtained by converting a first-order side current value of the power supply to an average value via a sampling integration method.

8. The operation method of claim 7, further comprising sensing the first phase current and the second phase current only during a PWM on-time.

9. The operation method of claim 8, further comprising increasing a current sensing level using a parallel bias voltage when sensing the currents.

10. The operation method of claim 1, wherein the power supply comprises a direct current-direct current (DC-DC) convertor or an alternating current-direct current (AC-DC) converter.

11. A power supply comprising:
    a power supply unit; and
    a current deviation controller configured to:
        control to calculate an inter-phase current deviation by averaging current deviations between a first phase current and a second phase current of the power supply unit,
        compare the inter-phase current deviation with a first threshold value,
        adjust a pulse width modulation (PWM) duty value of at least one of a first phase and a second phase according to a result of the comparing, and compensate for the inter-phase current deviation according to the adjusted PWM duty value, wherein the current deviation controller is further configured to control to, if the inter-phase current deviation is greater than the first threshold value, calculate a duty adjustment value using the inter-phase current deviation and a first gain and increase the PWM duty value of the second phase using the duty adjustment value.

12. The power supply of claim 11, wherein the current deviation controller is further configured to control to, if the inter-phase current deviation is less than a second threshold value, calculate the duty adjustment value using the inter-phase current deviation and a second gain and increase the PWM duty value of the first phase using the duty adjustment value.

13. The power supply of claim 12, wherein a sum of the first and second threshold values is 0.

14. The power supply of claim 11, wherein the current deviation controller is further configured to control to, when the inter-phase current deviation is equal to or less than the first threshold value and equal to or greater than a second threshold value, check whether the inter-phase current deviation is greater than 0 and adjust the PWM duty value of the first or second phase using a predetermined minimum duty value according to a result of the checking.

15. The power supply of claim 11, wherein the first phase current and the second phase current are individually obtained by converting a first-order side current value of the power supply to an average value via a sampling integration method, and wherein the first-order side is located at an input terminal that is not linked to any inductor or switch of the power supply.

16. The power supply of claim 11, further comprising at least one field effect transistor (FET) implemented to sense the first phase current and the second phase current only during a PWM on-time.

17. The power supply of claim 11, wherein the power supply unit is implemented with a direct current-direct current (DC-DC) convertor or an alternating current-direct current (AC-DC) converter.

* * * * *